United States Patent
Sterzik et al.

(10) Patent No.: US 9,740,263 B2
(45) Date of Patent: Aug. 22, 2017

(54) POWER SUPPLY UNIT FOR A COMPUTER SYSTEM AND ARRANGEMENT HAVING A CORRESPONDING POWER SUPPLY UNIT AND A COMPUTER SYSTEM

(71) Applicant: Fujitsu Technology Solutions Intellectual Property GmbH, München (DE)

(72) Inventors: Willi Sterzik, Augsburg (DE); Peter Busch, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 147 days.

(21) Appl. No.: 14/572,116

(22) Filed: Dec. 16, 2014

(65) Prior Publication Data

US 2015/0177809 A1    Jun. 25, 2015

(30) Foreign Application Priority Data

Dec. 20, 2013  (DE) .................. 10 2013 114 694
Feb. 26, 2014  (DE) .................. 10 2014 102 535

(51) Int. Cl.
  *G06F 1/00*   (2006.01)
  *G06F 1/32*   (2006.01)
  *G06F 1/26*   (2006.01)

(52) U.S. Cl.
  CPC .............. *G06F 1/32* (2013.01); *G06F 1/26* (2013.01); *G06F 1/3296* (2013.01); *Y02B 60/1285* (2013.01)

(58) Field of Classification Search
  CPC . G06F 1/3296; G06F 1/32; G06F 1/26; Y02B 60/1285

USPC ............. 713/320, 100; 345/690; 307/31, 82; 323/272, 283, 282, 271

See application file for complete search history.

(56) References Cited

U.S. PATENT DOCUMENTS

| | | |
|---|---|---|
| 3,824,450 A | 7/1974 | Carrington et al. |
| 4,074,182 A | 2/1978 | Weischedel |
| 4,855,665 A | 8/1989 | Mandelcorn |

(Continued)

FOREIGN PATENT DOCUMENTS

| | | |
|---|---|---|
| DE | 692 26 340 | 10/1998 |
| DE | 10 2007 052 880 | 5/2009 |

(Continued)

*Primary Examiner* — Aurel Prifti
(74) *Attorney, Agent, or Firm* — DLA Piper LLP (US)

(57) ABSTRACT

A power supply unit for a computer system including a first converter circuit with a first control circuit that converts an input-side electrical supply voltage into at least one first output voltage, a second converter circuit with a second control circuit that converts the input-side supply voltage into at least one second output voltage, wherein an output of the first converter circuit directly electrically connects to an output of the second converter circuit, a nominal level of the at least one first output voltage is higher by a predetermined voltage difference than a corresponding nominal level of the at least one second output voltage, the power supply unit includes an additional circuit on the input side of the second converter circuit, which additional circuit controls the second control circuit such that the second converter circuit operates with a minimum output power when the first converter circuit provides the at least one first output voltage.

12 Claims, 5 Drawing Sheets

(56) References Cited

U.S. PATENT DOCUMENTS

| | | | | |
|---|---|---|---|---|
| 4,860,188 | A | | 8/1989 | Bailey et al. |
| 5,319,536 | A | * | 6/1994 | Malik .................... H02J 1/102 <br> 307/82 |
| 5,450,003 | A | * | 9/1995 | Cheon .................. G06F 1/3203 <br> 323/272 |
| 2002/0041178 | A1 | * | 4/2002 | Hiraki ...................... G06F 1/26 <br> 323/272 |
| 2004/0215990 | A1 | * | 10/2004 | Allen ....................... G06F 1/26 <br> 713/320 |
| 2009/0302816 | A1 | * | 12/2009 | Kunimatsu ............. H02M 1/36 <br> 323/282 |
| 2012/0026759 | A1 | * | 2/2012 | Balakrishnan .... H02M 3/33523 <br> 363/21.15 |
| 2012/0139515 | A1 | * | 6/2012 | Li .......................... G06F 1/3287 <br> 323/282 |
| 2012/0144183 | A1 | * | 6/2012 | Heinrichs ........... G06F 11/3062 <br> 713/100 |
| 2014/0118413 | A1 | * | 5/2014 | Park ...................... G09G 3/3208 <br> 345/690 |
| 2014/0139196 | A1 | * | 5/2014 | Chen ..................... H02M 3/156 <br> 323/271 |
| 2014/0175883 | A1 | * | 6/2014 | Busch .................... H02J 1/102 <br> 307/31 |
| 2014/0281281 | A1 | * | 9/2014 | Zhang .................... G06F 12/00 <br> 711/148 |

FOREIGN PATENT DOCUMENTS

| | | |
|---|---|---|
| DE | 10 2010 035 112 | 2/2012 |
| EP | 2 056 183 | 5/2009 |

* cited by examiner

POWER SUPPLY UNIT FOR A COMPUTER SYSTEM AND ARRANGEMENT HAVING A CORRESPONDING POWER SUPPLY UNIT AND A COMPUTER SYSTEM

TECHNICAL FIELD

This disclosure relates to a power supply unit for a computer system, an arrangement having a corresponding power supply unit and a computer system.

BACKGROUND

In recent years, the demand to increase energy efficiency has risen sharply for all products. Efficiency factor has become a selling point, particularly for power supply units. The efficiency factor depends on many parameters, inter alia on the utilization of the power supply unit.

In particular, power supply units for computer systems are operated for long periods in what is called low-load operation. The efficiency curve of a power supply unit in low-load operation is thus particularly important. This power range is required, for example, in an energy-saving mode (standby) or some other operating mode with reduced power consumption of a computer system connected to the power supply unit.

Many methods are used to improve efficiency at low-load. For example, better components are used or the power supply unit is operated in the lower load range in what is known as burst mode.

In a classic power supply unit for computer systems, which can be designed, for example, as a switching-mode power supply, several voltage converters are used. Generally speaking, such a power supply unit comprises at least one primary or first converter circuit (main converter) and a second converter circuit (auxiliary power supply unit).

The main converter is designed for maximum output of a computer system and has an efficiency curve which describes a good efficiency, in particular in higher power ranges (for example, between 30 and 60 watts). In contrast, the auxiliary power supply unit is designed for lower outputs in a standby operation and has an efficiency curve which represents a favorable efficiency only for low outputs (up to about 30 watts).

To exploit the more favorable efficiency of the auxiliary power supply unit compared to the main power supply unit in standby operation and, conversely, in a higher load range to exploit the more favourable efficiency of the main power supply unit compared to the auxiliary power supply unit, conventional switching-mode power supply units with different converter circuits for different power ranges provide for the main converter to be switched on and off. Thus, in standby operation the auxiliary power supply unit is generally active, whereas in the higher power range for a main operation both the main converter and the auxiliary power supply unit are active.

To control the power of the converter circuits in a power supply unit, use is made of control circuits, which regulate the relevant converter circuit to a required power output based on power consumption of the computer system. In this connection, for example, a control circuit can be provided for each converter circuit in the power supply unit, i.e. a first control circuit for the first converter circuit (main converter) and a second control circuit for the second converter circuit (auxiliary power supply unit).

If it is desired to use the more favorable efficiency of the auxiliary power supply unit also for operating states and/or circuit parts of a connected device normally supplied by the main power supply unit, the outputs must be interconnected.

The drawback of such a solution is that during operation of the first converter circuit (main converter), the control circuit of the second converter circuit (auxiliary power supply unit) adjusts the output power of the latter downwardly and switches it off completely. If in such a case a switch-over is made from the first converter circuit to the second converter circuit, then the second converter circuit first has to be started up (for example, using what is known as a soft-start process). Because of the unavoidable duration of the start-up process of the second converter circuit, voltage drops may occur, with possibly problematic loss of supply for a computer system. This can lead to an error in the computer system and in the worst case to failure of electrical components and assemblies in the computer system.

Alternatively, it is possible to let the first converter circuit continue to run until the second converter circuit is operational or to keep both converter circuits permanently active in parallel. Both solutions have the disadvantage, however, that the control circuit of the converter circuit having the lower output voltage will switch off this converter circuit.

It could therefore be helpful to provide a combination of two interconnected converter circuits to increase efficiency in a power supply unit, while nevertheless preventing the risk of a voltage drop when switching over between the two converter circuits and minimizing losses in the power supply unit.

SUMMARY

We provide a power supply unit for a computer system including a first converter circuit with a first control circuit that converts an input-side electrical supply voltage into at least one first output voltage, a second converter circuit with a second control circuit that converts the input-side supply voltage into at least one second output voltage, wherein an output of the first converter circuit directly electrically connects to an output of the second converter circuit, a nominal level of the at least one first output voltage is higher by a predetermined voltage difference than a corresponding nominal level of the at least one second output voltage, the power supply unit includes an additional circuit on the input side of the second converter circuit, which additional circuit controls the second control circuit such that the second converter circuit operates with a minimum output power when the first converter circuit provides the at least one first output voltage.

We also provide an arrangement including a power supply unit according to Claim 1, and a computer system, wherein the computer system connects to the power supply unit for supply with an electrical output voltage at the power supply unit.

LIST OF REFERENCE SIGNS

Figure 1:
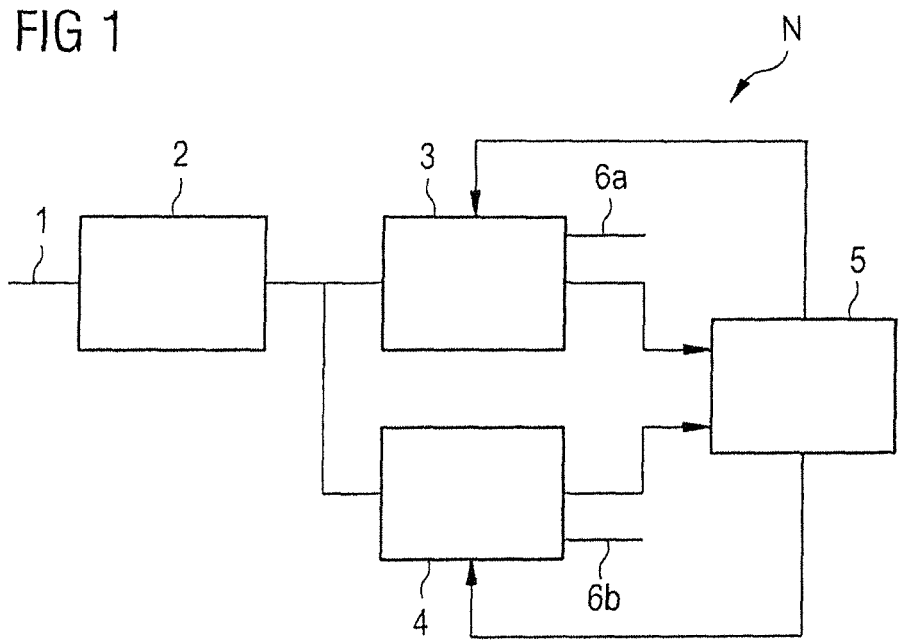
FIG. 1 shows a basic circuit diagram of a power supply unit according to the prior art.

1 Primary-side supply voltage input
2 EMI filter
3 First converter circuit
4 Second converter circuit
5 Control system
5a First control circuit
b Second control circuit
6 Output
6a Output of the first converter circuit 3
6b Output of the second converter circuit 4
7 Additional circuit
8 Monitoring circuit
9 Switching logic
10 Comparator for output current
11 Internal node
12 Internal node (output of first converter circuit)
13 Internal node (output of second converter circuit)
N Power supply unit
S1 Switching signal
S2 Switching signal
I Efficiency curve of the first converter circuit
II Efficiency curve of the second converter circuit
III Combined efficiency curve.

DETAILED DESCRIPTION

Our power supply units comprise:
a first converter circuit with a first control circuit that converts an input-side electrical supply voltage into at least one first output voltage and
a second converter circuit with a second control circuit that converts the input-side supply voltage into at least one second output voltage.

One output of the first converter circuit directly electrically connects to an output of the second converter circuit and a nominal level of the at least one first output voltage is set to be higher by a predetermined voltage difference than a corresponding nominal level of the at least one second output voltage. In addition, the power supply unit comprises an additional circuit on the input side of the second converter circuit, which additional circuit controls the second control circuit such that the second converter circuit operates with a minimum output power when the first converter circuit provides the at least one first output voltage.

Such a power supply unit has the advantage that a combination of a first and a second converter circuit can be achieved, wherein electrical losses in the power supply unit computer node are reduced or minimized and advantageous efficiency curves of the first and second converter circuit can be utilized.

In this context, "direct" electrical connection of the outputs of the two converter circuits means that no electrical components (apart from electrical leads) are provided between the output of the first converter circuit and the output of the second converter circuit. Coupling diodes in particular (for example, what are known as ORing diodes) can be omitted, which means that the electrical power loss at relevant components can be eliminated.

In the case of conventional power supply unit solutions, the problem with such a "hard" interconnection of the outputs of the first and second converter circuit is that the second control circuit switches off the second converter circuit completely during the operation of the first converter circuit, as explained above. However, the additional circuit controls the second control circuit such that the second converter circuit is operated with a minimum output power during operation of the first converter circuit.

Thus, the additional circuit of the power supply unit defined here enables not only two converter circuits to be combined, each with an advantageous efficiency curve in low-load operation or heavy-load operation, by connecting the outputs of the two converter circuits, but by employing "hard" interconnection also enables power loss to be additionally reduced by omitting conventional components such as coupling diodes.

In the case of the power supply unit defined here, a nominal level of the at least one first output voltage (achieved by the first converter circuit) is advantageously set to be higher by a predetermined voltage difference than a corresponding nominal level of the at least one second output voltage (achieved by the second converter circuit). For example, the nominal output voltage of the first converter circuit can be adjusted to 100 mV to 200 mV higher than the nominal output voltage of the second converter circuit. For example, the nominal output voltage of the first converter circuit can be 12.1 volts, whereas the nominal output voltage of the second converter circuit is 11.9 volts.

Generally, a higher adjustment of the first converter circuit in relation to the second converter circuit has the advantage that at a defined switchover point during switching over from a low-load operation by the second converter circuit to a heavy-load operation by the first converter circuit it is possible to ensure that in the latter operating range the electrical energy can be delivered in a stable manner by the first converter circuit. This is advantageous in particular in the case of "hard" interconnection of the outputs of the two converter circuits.

With conventional power supply unit solutions, a different adjustment of the first and second converter circuits would reinforce the effect that owing to the potential difference between the output voltage at the output of the first converter circuit and the output voltage at the output of the second converter circuit the second control circuit adjusts the second converter circuit downwards and switches it off. This problem can advantageously also be counteracted by the additional circuit of the power supply unit defined here. This additional circuit influences the second control circuit such that the second converter circuit continues to be operated with a minimum output power despite an operation of the first converter circuit.

In this manner, a different adjustment of the first and second converter circuits in the power supply unit defined here does not result in the second converter circuit being switched off during operation of the first converter circuit. Nevertheless, it is possible to ensure that at a defined switch-over point the first converter circuit will reliably and steadily provide an output voltage to supply a computer system.

In the case of "hard" interconnection of the outputs of the two converter circuits and with different adjustment of the output voltages of the two converter circuits, the additional circuit therefore prevents the second converter circuit from being switched off by the second control circuit during voltage supply to the output of the power supply unit via the first converter circuit.

In this manner, the second converter circuit operates with a minimum output power (with a minimum current at pre-defined output voltage of the second converter circuit). The additional circuit here intervenes in the second control circuit and is able to influence and "detune" this to prevent the second converter circuit from being switched off.

A general advantage of such a power supply unit is therefore that when a switchover from the first converter circuit to the second converter circuit is made, the latter immediately is able to provide an output voltage for the operation of a computer system, without the second converter circuit first having to be started up with a delay. In this manner, a voltage drop when switching over between the first converter circuit and the second converter circuit can be prevented. Thus, two converter circuits having completely different characteristics for different power ranges of a computer system can be combined and coupled to one another without a critical supply loss at the computer system.

The second converter circuit preferably has a nominal output power smaller than a nominal output power of the first converter circuit. The second converter circuit is thus advantageously designed for a lower power range (low-load operation or standby operation), whereas the first converter circuit is designed for a higher power range (main operation). For example, the second converter circuit is designed for a power range of e.g. 0 watt to 30 watts, (and is controlled, e.g. 10 watts to 30 watts) whereas the first converter circuit is designed for a power range of e.g. 0 watt to 300 watts (and is controlled e.g. 30 watts and 60 watts).

The first converter circuit can preferably be switched on and off via a switching signal. The power supply unit preferably has a monitoring circuit to monitor an electrical current at an output of the power supply unit and in accordance therewith to generate the switching signal.

The first converter circuit can be switched on specifically by the switching signal. Thus, the first converter circuit can be switched on when an output voltage for an operation of a computer system is to be provided via the first converter circuit. Conversely, the first converter circuit can be switched off when an output voltage for an operation of a computer system is to be provided via the second converter circuit. When the first converter circuit is switched on, the second converter circuit continues to be operated with a minimum output power, as explained above.

It is conceivable to connect the monitoring circuit to the first converter circuit so that a switching signal generated by the monitoring circuit controls an input of the first converter circuit and thus switches the first converter circuit on or off. Alternatively or additionally, it is possible to connect the monitoring circuit to the first control circuit so that a switching signal generated by the monitoring circuit is converted by the first control circuit into an output variable of the first control circuit and in this manner influences an input variable at the first converter circuit so that the first converter circuit can be switched.

Advantageously, the additional circuit is designed in a first operating state to control the second control circuit to enable a control of the second converter circuit by the second control circuit by an input variable of the second converter circuit to a desired output power. Further, the additional circuit is designed in a second operating state to drive the second control circuit to prevent control of the second converter circuit by the second control circuit by the input variable of the second converter circuit to a desired output power that falls below the minimum output power.

In the first operating state, the additional circuit thus does not intervene in the second control circuit and, therefore, the second converter circuit can be controlled via the second control circuit substantially unaffected by the additional circuit. In this connection, the input variable of the second converter circuit can be influenced, for example, such that a decrease in the input variable results in a decrease in the output power of the second converter circuit, and an increase in the input variable results in an increase in the output power of the second converter circuit.

In the second operating state, however, the additional circuit intervenes in the second control circuit such that a decrease in the input variable below a critical threshold value on the basis of a control setpoint is prevented by the second control circuit and, therefore, the second converter circuit is prevented from being switched off by a control setpoint of the second control circuit.

The input variable can be, for example, a control signal or a voltage signal at the relevant input of the second converter circuit, which is maintained at the input by a pull-up resistor and/or is generated by a controlled power source. A corresponding decrease in this control signal to a lower level can indicate to the second converter circuit that a low or no power is to be delivered. Conversely, an increase in the control signal to a high level can indicate to the second converter circuit that a high power is to be delivered. A corresponding output power can be set, for example, by a corresponding duty cycle of switching means on the input side of the second converter circuit. These switching means control via a corresponding switching frequency, possibly with a corresponding duty cycle, the power transfer from the input side of the second converter circuit to the output side of the second converter circuit.

Advantageously, the second control circuit has switching means that generate from the output voltage of the second converter circuit an output variable of the second control circuit, which can be applied to the input variable of the second converter circuit. For example, at the output of the second converter circuit an electrical voltage can be tapped by the second control circuit, the voltage changing as a function of a change in the power consumption in a connected computer system.

A corresponding change generates in the second control circuit a correspondingly changed output variable, for example, an output current or an output voltage of the second control circuit, which changes the input variable of the second converter circuit, for example, a control signal or voltage signal, correspondingly. A change in the input variable at the second converter circuit ultimately results in a change in the output power at the output of the second converter circuit.

The switching means of the second control circuit preferably comprise an optocoupler having at least one light-emitting diode and a light-sensitive transistor. In this manner, galvanically isolated control signals can be transmitted from the second control circuit at the output side of the second converter circuit to the input side of the second converter circuit. Through a corresponding receive current the light-sensitive transistor can form a collector current, which lets a corresponding collector emitter voltage drop at the light-sensitive transistor. This voltage can be fed as an output variable of the second control circuit to the input of the second converter circuit and can there be used as an input signal for the power regulation.

Advantageously, the additional circuit comprises switching means to increase the output variable of the second control circuit depending on an auxiliary variable. The auxiliary variable can be, for example, an input side auxiliary voltage of the second converter circuit. An increase in the output variable of the second control circuit results in an increase in the input variable of the second converter circuit and, therefore, a decrease in the output power based on a control setpoint by the second control circuit is prevented.

In this manner, the additional circuit increases the input variable by intervention in the output variable of the second control circuit and prevents the second converter circuit from being switched off. The second converter circuit can thus be adjusted downwardly by the second control circuit only to a minimum output power.

Advantageously, the switching means of the additional circuit comprise at least one Zener diode and a transistor, wherein the transistor is directly electrically connected to the second control circuit.

For example, by the Zener diode of the additional circuit the auxiliary variable, for example, an auxiliary voltage of the second converter circuit can be converted into a control current for the transistor of the additional circuit, wherein the transistor acts as a controllable switching means to increase the output variable of the second control circuit, for example, as a voltage boost of a collector-emitter voltage at the light-sensitive transistor of the second control circuit.

The Zener diode is advantageously adjustable by way of a voltage divider. The Zener diode can be, for example, an adjustable Zener diode. Adjustability has the advantage that the additional circuit can be adapted to corresponding operating environments of the first and second converter circuits within the power supply unit.

The above issues may also be addressed by an arrangement having a power supply unit of the kind defined and a computer system, wherein the computer system connects to the power supply unit for supply with an electrical output voltage at the power supply unit.

In the context of the power supply unit configuration defined here, a computer system may be any computer system, for example, a desktop PC, server, notebook, tablet and so on.

Further advantages are defined in the following description of the figures.

FIG. 1 shows a basic circuit diagram of a power supply unit N according to the prior art comprising a primary-side supply voltage input 1 at which, for example, an alternating voltage from the supply system is made available. Further, the power supply unit N comprises an electromagnetic interference filter 2 (what is known as an EMI filter or line filter), which, for example, can comprise throttle or compensation members that suppress the primary side supply voltage.

The power supply unit N further comprises a first converter circuit 3 and a second converter circuit 4 and a control system 5 that controls the first and second converter circuits 3, 4.

The first converter circuit 3 can be, for example, a main converter for main operation of an electrical device connected to the power supply unit N, and is configured, for example, for a power range from about 0 watt to 300 watts (and, for example, is controlled to 30 watts to 60 watts). The second converter circuit 4 can be, for example, an auxiliary power supply unit configured for a low-load operation of an electrical device connected to the power supply unit N and, for example, operates in a power range from about 0 watts to 30 watts (and, for example, is controlled to 10 watts to 30 watts).

For a change-over between a heavy-load operation and a standby operation, optionally, with the assistance of the control system 5, the first converter circuit 3 may be switched on and off.

Finally, an output voltage transformed by the first and second converter circuits 3 and 4 at a respective output 6a, 6b of the power supply unit N is made available for the operation of a connected device. The connected device can be, for example, a computer system or other electrical device.

Figure 2:
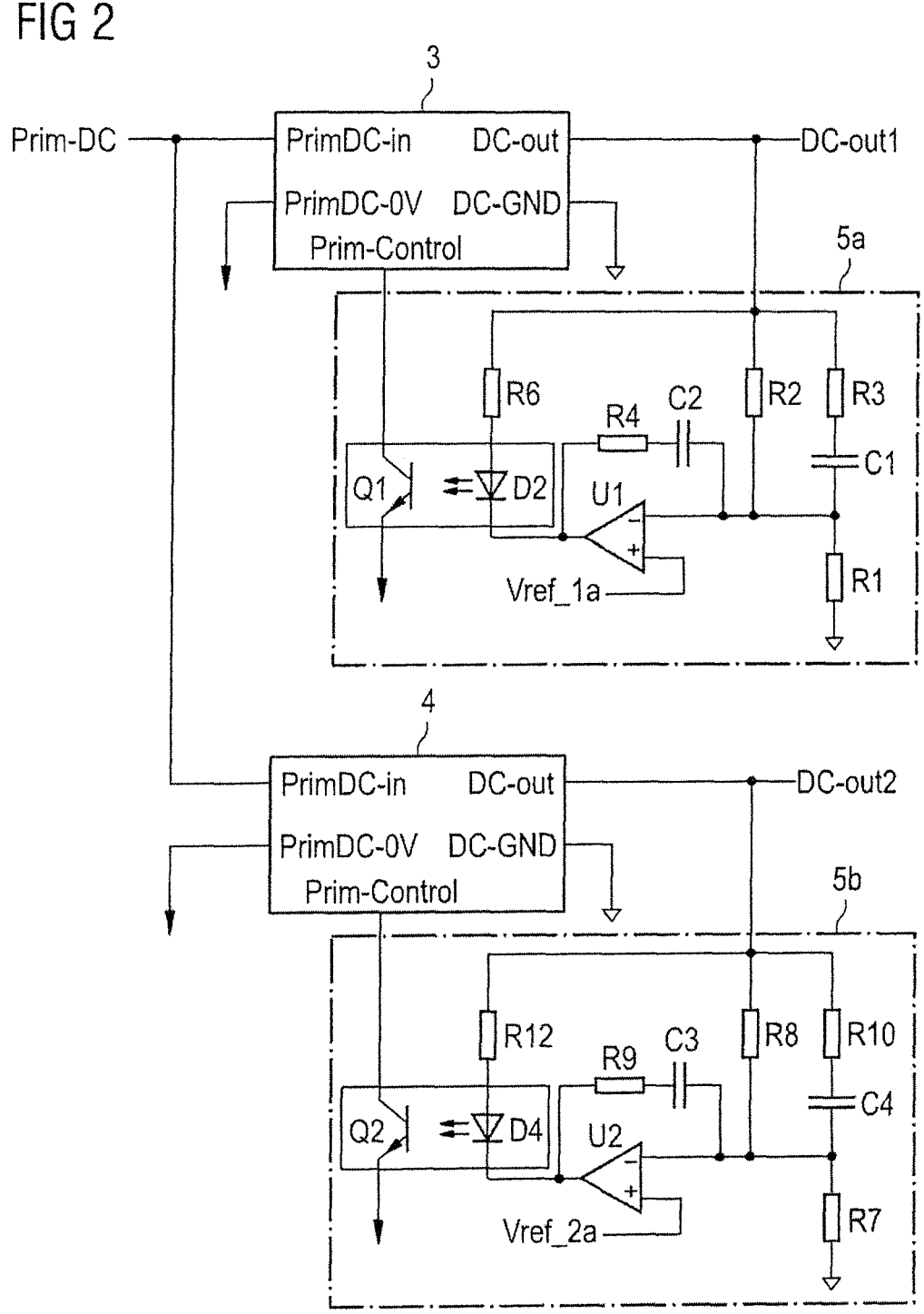
FIG. 2 shows an example of the circuitry of power supply unit components according to the prior art.

FIG. 2 shows an example of a circuit of components of the power supply unit N according to the configuration from FIG. 1.

FIG. 2 shows in particular an interconnection of the first converter circuit 3 with a first control circuit 5a and of a second converter circuit 4 with a second control circuit 5b. On the input side, the first converter circuit 3 and the second converter circuit 4 are provided with a supply voltage Prim-DC. The input-side supply voltage Prim-DC can be, for example, a supply voltage from the supply voltage system (230 V mains system) that has already been rectified and optionally smoothed. The input-side supply voltage Prim-DC is provided at the respective input PrimDC-In for the first and second converter circuit 3 and 4. Here, there is a corresponding input voltage potential in relation to a primary-side reference potential Prim DC-0V.

Both the first and the second converter circuit 3 and 4 comprise components for voltage conversion, for example, a transformer and switching means that clock the transformer to convert the input-side supply voltage Prim-DC into an output voltage. Corresponding configurations of a transformer and switching means that clock the transformer are well known and require no further explanation here.

The first and second converter circuit 3 and 4 each provide a corresponding output voltage at outputs DC-out 1 and DC-out 2 respectively. On that output side (secondary side) there is a corresponding output voltage potential via a reference potential (ground) DC-GND.

The first and second control circuits 5a and 5b are on the output side of the first and second converter circuit 3 and 4 respectively. The first control circuit 5a connects to the output DC-out 1 of the first converter circuit 3. The second control circuit 5b connects to the output DC-out 2 of the second converter circuit 4.

The first control circuit 5a is at the output voltage potential of the first converter circuit 3, and the second control circuit 5b is at the output voltage potential of the second converter circuit 4. Depending on how high or low the power consumption of an electrical device connected to the particular output DC-out 1 and DC-out 2 is, in the first and second control circuits 5a and 5b an electrical voltage is established which, by the voltage divider circuit R1, R2 (see control circuit 5a) and the voltage divider circuit R7, R8 (see control circuit 5b), generates at the operational amplifier U1 of the first control circuit 5a and at the operational amplifier U2 of the second control circuit 5b an electrical voltage with respect to a reference voltage Vref_1a (see first control circuit 5a) and Vref-2a (see second control circuit 5b), respectively.

The output of each operational amplifier U1 of the first control circuit 5a and U2 of the second control circuit 5b sets a control current at each optocoupler circuit Q1, D2, R6 of the first control circuit 5a and Q2, D4, R12 of the second control circuit 5b, which causes in each photosensitive transistors Q1 and Q2 a boost current (collector current) controlled via a corresponding receive current. The boost current causes a change in the collector-emitter voltage at each transistor Q1 and Q2, and, hence, in the input variable Prim-Control at the first and second converter circuit 3 and 4, respectively.

The input variable Prim-Control can be, for example, a voltage at the relevant input of the first and second converter circuit 3 and 4, which can be adjusted, for example, via a pull-up resistor and a controlled current source. In this manner, the input variable Prim-Control at the first or second converter circuit 3 or 4 changes depending on the transistor current at the transistor Q1 and Q2 respectively and informs the first and second converter circuit 3 and 4 of a change in the required output power and, therefore, the first and second converter circuit 3 and 4 change the clocking correspondingly via internal switching means so that the power transmission in the first and second converter circuit 3 and 4 is changed.

Figure 3:
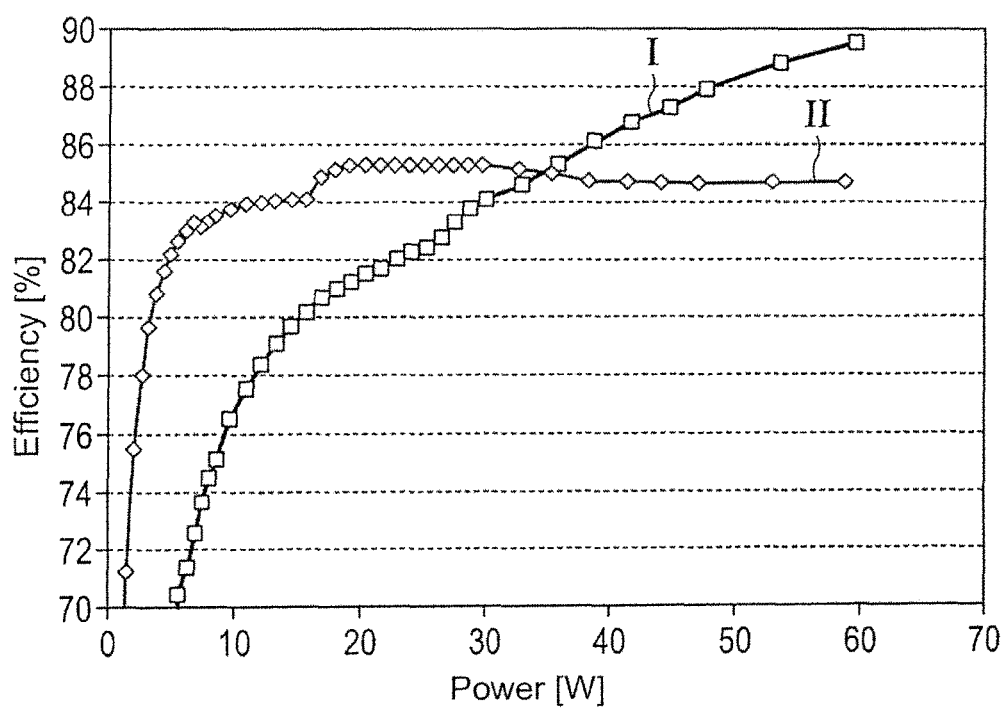
FIG. 3 shows efficiency curves of a first and second converter circuit in a power supply unit.

FIG. 3 shows efficiency curves I and II of the first and second converter circuit 3 and 4 according to FIGS. 1 and 2. The power in watts [W] is plotted on the x-axis, while the efficiency in percent [%] is plotted on the y-axis. The efficiency curve I describes the efficiency curve of the first converter circuit 3, while the efficiency curve II describes the efficiency curve of the second converter circuit 4.

From FIG. 3 it is clear that the first converter circuit 3 (curve I) appears favorable for a power consumption from, e.g. 35 watts, whereas the second converter circuit 4 (curve II) appears more favorable for a power consumption from e.g. 0 watts to 35 watts. This means that both efficiency curves I and II intersect at a change-over point at about 35 watts. In a low-load range, the operation of the second converter circuit 4 (curve II) is advantageous, whereas in a heavy-load range the operation of the first converter circuit 3 (curve I) is advantageous. Thus, both for a low-load range and for a heavy-load range the in each case more favorable efficiency curve of the first and second converter circuits 3 and 4 is to be used.

Figure 4:
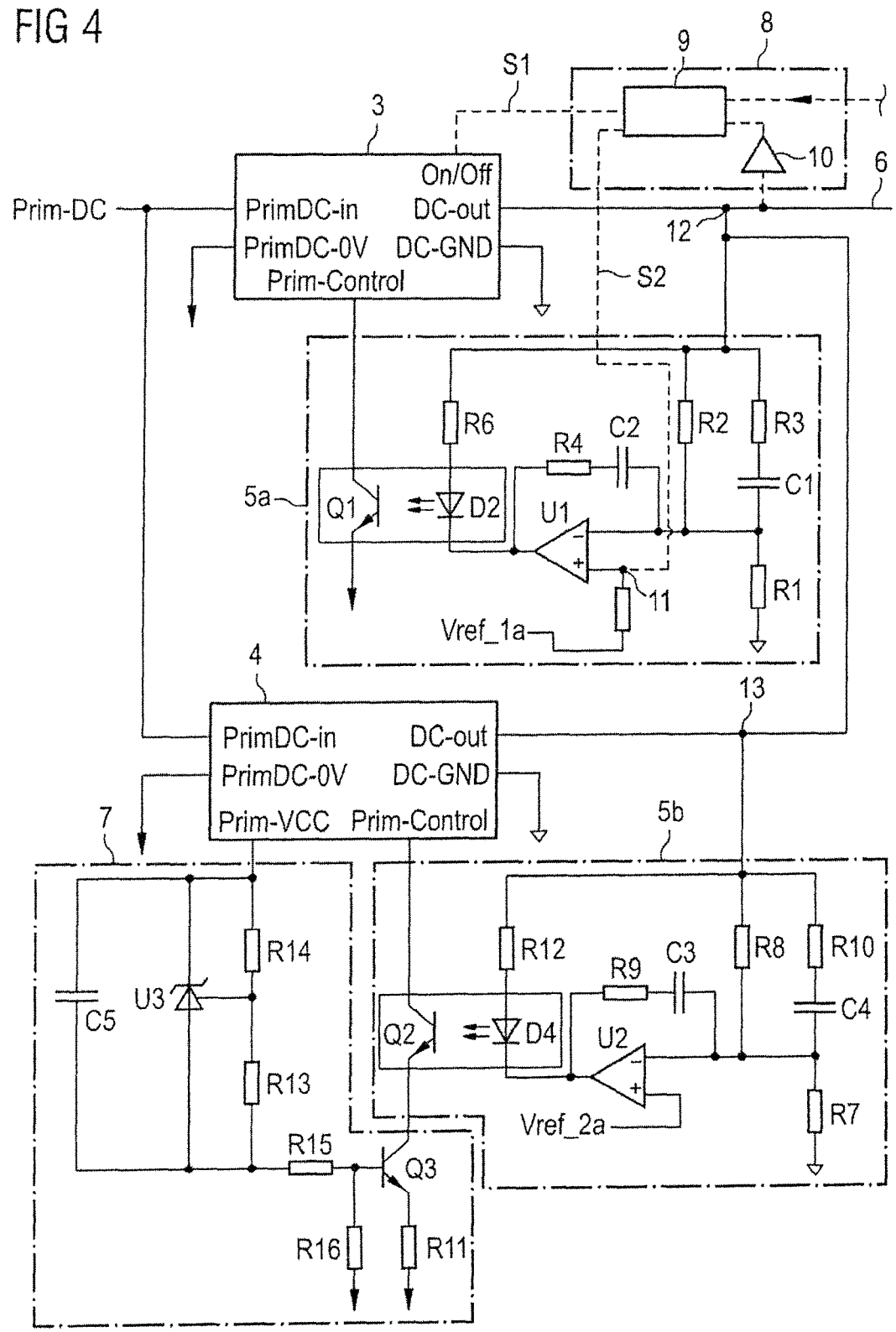
FIG. 4 shows an example of our circuitry of power supply unit components.

FIG. 4 shows a circuit construction of the first and second converter circuit 3 and 4 and of the first and second control circuit 5a and 5b according to FIG. 2, wherein the circuit has been advantageously extended and modified.

In addition to the components already mentioned, the circuitry from FIG. 4 substantially comprises an additional circuit 7 (bottom left) connected to the input side of the second converter circuit 4 and the output of the second control circuit 5b. Further, according to FIG. 4, the outputs DC-out of the first and second converter circuit 3 and 4 are directly "hard" connected to one another, i.e. without the insertion of further components, via an electrical lead (see internal nodes 12 and 13). In this manner, the first and second converter circuits 3 and 4 can both directly serve the output 6 of the power supply unit with an output voltage.

In a low-load operation, the second converter circuit 4, controlled via the second control circuit 5b, is active and delivers at output 6 an output voltage or, depending on power demand, a corresponding output power to an electrical device, in particular a computer system, connected to the output 6. In low-load operation the first converter circuit 3 is switched off.

The second converter circuit 4 can be adjusted, for example, to an output voltage of 11.9 V. Depending on the power consumption of an electrical device connected to the output 6, the second control circuit 5b—as already explained in conjunction with FIG. 2—controls the output voltage at the output DC-out (see internal node 13) via the input variable Prim-Control of the second converter circuit 4.

Further, at an output Prim-VCC the second converter circuit 4 provides an auxiliary voltage, which supplies the primary side of the converter circuit 4, the primary side of the transformer circuit 3 and the additional circuit 7. In low-load operation, the voltage at the output Prim-VCC is, for example, 16 V. Via a Zener diode U3 adjustable by the voltage divider circuit R13, R14, a base current can be set at a bipolar transistor Q3 of the additional circuit 7 by a further voltage divider circuit R15, R16.

In low-load operation of the second converter circuit 4 with a correspondingly higher voltage at the output Prim-VCC, the base current at the transistor Q3 or the base emitter voltage at the transistor Q3 can be adjusted such that the transistor Q3 is in saturation. The emitter of the optocoupler-transistor Q2 of the second control circuit 5b, which directly connects to the transistor Q3 is, therefore, virtually at the primary reference potential PrimDC-0V. In low-load operation the second converter circuit 4 accordingly functions like a completely normal transformer, wherein a control signal can be transmitted via the control signals of the light-emitting diode D4 to the photosensitive transistor Q2 of the optocoupler-circuit of the second control circuit 5b to influence the input variable Prim-Control of the second converter circuit 4 and, as explained, regulate the output power.

The converter circuit 3 can be activated by a monitoring circuit 8, which taps the current at the output 6 via a comparator 10 and in accordance therewith generates a switching signal S1 and/or S2 via a switching logic 9. Alternatively, a switching signal S1 can be fed to an input On/Off of the first converter circuit 3 and/or a switching signal S2 can be fed to an internal node 11 of the first control circuit 5a. In both cases, the first converter circuit 3 is caused, either directly or by the first control circuit 5a, to switch on or off.

It is possible to feed an external control signal (originating, for example, from the connected electrical device) via a separate line to the monitoring circuit 8 and the internal switching logic 9, as indicated in FIG. 4.

If the first converter circuit 3 is switched on by the monitoring circuit 8 for a heavy-load operation at the output 6, then a further supply to an electrical device connected to the output 6 is carried out via the first converter circuit 3, which provides a corresponding output voltage at its output DC-out (see internal node 12).

The nominal output voltage of the first converter circuit 3 is advantageously somewhat higher than the nominal output voltage of the second converter circuit 4. For example, the first converter circuit 3 can be adjusted to an output voltage of 12.1 V (compared to an output voltage of 11.9 V of the second converter circuit 4, see above). Owing to the "hard" connection of the outputs DC-out of the first and second converter circuit 3 and 4 (see internal nodes 12 and 13), without further measures the second control circuit 5b of the second converter circuit 4 would detect the higher potential at the output DC-out (internal node 12) of the first converter circuit 3 and via the optocoupler Q2, D4 adjust the input variable Prim-Control of the second converter circuit 4 downwardly and switch the second converter circuit 4 off completely. Upon renewed switching off of the first converter circuit 3 by the monitoring circuit 8 for a new low-load operation, this would lead to a delayed reactivation of the second converter circuit 4 and, hence, in some cases to a voltage drop at the output 6.

To avoid this, the additional circuit 7 prevents the second converter circuit 4 from being switched off completely in heavy-load operation. By an initial downward adjustment of the input variable Prim-Control of the second converter circuit 4 by the second control circuit 5b, a clock frequency in the second converter circuit 4 decreases so that the auxiliary voltage Prim-VCC of the second converter circuit 4 also decreases (for example, to below 12 V). A decrease in the auxiliary voltage Prim-VCC causes a reduced base current in the additional circuit 7 or a reduced base-emitter voltage at the transistor Q3 (via Zener diode U3) so that the latter passes from the saturation range into the linear range and thus forms a controlled voltage boost for the receive transistor Q2 of the second control circuit 5b. The voltage at the input Prim-Control therefore increases somewhat so that a minimum power is generated.

Despite fully activated optocoupler Q2, D4 of the second control circuit 5b, the additional circuit 7 therefore prevents the input variable Prim-Control at the second converter circuit 4 from being reduced to or below a switch-off value, wherein the input variable Prim-Control remains boosted such that the second converter circuit 4 continues to operate with a minimum output power in parallel with the main operation of the first converter circuit 3. In this operating state, the additional circuit 7 therefore intervenes in the second control circuit 5b and "tunes" this so that the input variable Prim-Control remains raised above a critical switch-off value.

In this manner, in a subsequent low-load operation, the second converter circuit 4 can immediately provide an increased output power at output 6 (via internal node 13) without a voltage drop.

In addition to preventing the risk of a voltage drop when switching over between the first and the second converter circuits 3 and 4, the circuit according to FIG. 4 additionally has the advantage that owing to the "hard" interconnection of the outputs of the first and second converter circuits 3 and 4 (internal nodes 12 and 13) a further power loss by internal components such as coupling diodes, for example, between the first and the second converter circuits 3 and 4 can be avoided.

When the second converter circuit 4 is adjusted downwardly, the minimum output power can be calculated such that the auxiliary voltage Prim-VCC is also supplied via the second converter circuit 4. Alternatively, it is also possible for the second converter circuit to be operated in this operating mode in what is called burst mode. Further, it is possible for the additional circuit 7 to activate only the burst mode, which is sufficient to maintain the auxiliary voltage Prim-VCC. Alternatively or in addition, it is also possible to adjust the critical voltage threshold of the auxiliary voltage Prim-VCC such that it corresponds to the minimum voltage of the primary components of the first converter circuit 3 (for example, 13 V) so that the auxiliary voltage Prim-VCC can be supplied by the first converter circuit 3 in heavy-load operation.

Naturally, instead of the adjustable Zener diode U3 in the additional circuit 7, a normal Zener diode can also be used. In that case, the voltage divider circuit R13, R14 would be omitted.

Figure 5:
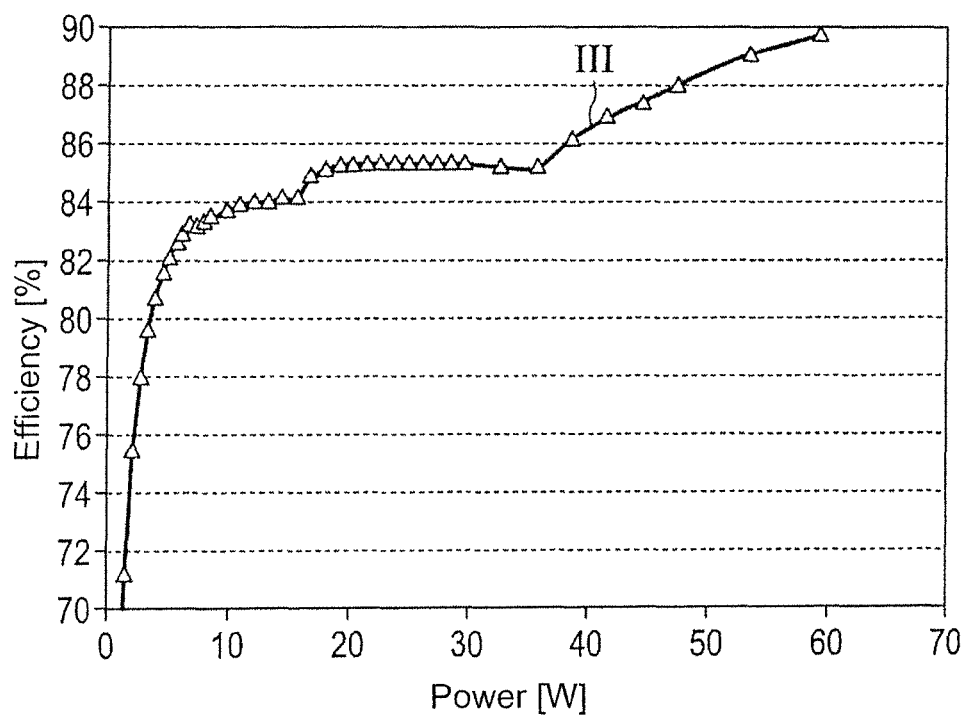
FIG. 5 shows an efficiency curve of an example of our power supply unit.

FIG. 5 shows a combined efficiency curve III during operation of the first and second converter circuit 3 and 4 according to FIG. 4. It is apparent that in a power range from about 5 to 35 watts the efficiency curve of the second converter circuit 4 (compare FIG. 3) is significant, whereas from a power requirement of 35 watts upwards the efficiency curve of the first converter circuit 3 (compare FIG. 3) is significant.

It may be necessary, when the first and second converter circuits 3 and 4 are combined as per FIG. 4 to increase somewhat the operating range of the second converter circuit 4, which typically is 10 to 20 watts.

Using our circuit arrangements, it is possible with two different converter circuits 3 and 4 to feed a common output voltage and switch to and fro between the two converter circuits 3 and 4 without voltage drops. Further, our circuit arrangements reduce internal losses by avoiding conventional components such as coupling diodes between the two converter circuits 3 and 4.

The power supply unit configuration illustrated can be used to supply any electrical devices, in particular advantageously to supply a computer system. All the illustrated configurations have been selected merely by way of example within the framework of the central idea of our power supply units, arrangements and computer systems.

The invention claimed is:

1. A power supply unit for a computer system comprising:
    a first converter circuit comprising components for voltage conversion to convert an input-side electrical supply voltage into at least one first output voltage and a first control circuit to regulate the first converter circuit to a required power output,
    a second converter circuit comprising components for voltage conversion to convert the input-side supply voltage into at least one second output voltage and a second control circuit to regulate the second converter circuit to a required power output,
wherein
    an output of the first converter circuit directly electrically connects to an output of the second converter circuit such that no electrical components apart from electrical leads are provided between the output of the first converter circuit and the output of the second converter circuit,
    a nominal level of the at least one first output voltage is higher by a predetermined voltage difference than a corresponding nominal level of the at least one second output voltage,
    the power supply unit comprises an additional circuit on an input side of the second converter circuit, which additional circuit controls the second control circuit such that the second converter circuit operates with a minimum output power when the first converter circuit provides the at least one first output voltage.

2. The power supply unit according to claim 1, wherein the second converter circuit has a nominal output power smaller than a nominal output power of the first converter circuit.

3. The power supply unit according to claim 1, wherein the first converter circuit can be switched on and off via a switching signal.

4. The power supply unit according to claim 3, wherein the power supply unit has a monitoring circuit that monitors an electrical current at an output of the power supply unit and in accordance therewith generates the switching signal.

5. The power supply unit according to claim 1, wherein the additional circuit in a first operating state, drives the second control circuit to enable control of the second converter circuit by the second control circuit by an input variable (Prim-Control) of the second converter circuit to a desired output power, and in a second operating state drives the second control circuit to prevent control of the second converter circuit by the second control circuit by the input variable (Prim-Control) of the second converter circuit to a desired output power that falls below the minimum output power.

6. The power supply unit according to claim 1, wherein the second control circuit has a switch that generates from the output voltage of the second converter circuit an output variable of the second control circuit which can be applied to an input variable (Prim-Control) of the second converter circuit.

7. The power supply unit according to claim 6, wherein the switch of the second control circuit comprises an optocoupler having at least one light-emitting diode and a light-sensitive transistor.

8. The power supply unit according to claim 6, wherein the additional circuit comprises a switch that increases the output variable of the second control circuit depending on an auxiliary variable (Prim-VCC).

9. The power supply unit according to claim 8, wherein the auxiliary variable (Prim-VCC) is an input-side auxiliary voltage of the second converter circuit.

10. The power supply unit according to claim 8, wherein the switch of the additional circuit comprises at least one Zener diode and a transistor, and the transistor directly electrically connects to the second control circuit.

11. The power supply unit according to claim 10, wherein the Zener diode is adjustable by a voltage divider circuit.

12. An arrangement comprising a power supply unit according to claim 1, and a computer system, wherein the computer system connects to the power supply unit for supply with an electrical output voltage at the power supply unit.

\* \* \* \* \*